(12) United States Patent
Hameed et al.

(10) Patent No.: US 12,249,847 B2
(45) Date of Patent: Mar. 11, 2025

(54) WIRELESS POWER TRANSFER

(71) Applicant: 3M INNOVATIVE PROPERTIES COMPANY, St. Paul, MN (US)

(72) Inventors: Zohaib Hameed, Woodbury, MN (US); Jaewon Kim, Woodbury, MN (US); Sithya S. Khieu, Eden Prairie, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 565 days.

(21) Appl. No.: 17/309,781

(22) PCT Filed: Dec. 13, 2019

(86) PCT No.: PCT/IB2019/060768
§ 371 (c)(1),
(2) Date: Jun. 17, 2021

(87) PCT Pub. No.: WO2020/141378
PCT Pub. Date: Jul. 9, 2020

(65) Prior Publication Data
US 2022/0052559 A1    Feb. 17, 2022

Related U.S. Application Data

(60) Provisional application No. 62/787,005, filed on Dec. 31, 2018.

(51) Int. Cl.
*H02J 50/23* (2016.01)
*H02J 50/00* (2016.01)
*H02J 50/12* (2016.01)

(52) U.S. Cl.
CPC ............ *H02J 50/23* (2016.02); *H02J 50/005* (2020.01); *H02J 50/12* (2016.02); *H02J 2310/22* (2020.01)

(58) Field of Classification Search
USPC ......................................................... 320/108
See application file for complete search history.

(56) References Cited

U.S. PATENT DOCUMENTS

| 7,926,728 B2 | 4/2011 | Raggam |
| 8,653,698 B2 | 2/2014 | Baarman |

(Continued)

FOREIGN PATENT DOCUMENTS

| CN | 103151825 B | 2/2015 |
| CN | 105515141 A | 4/2016 |

(Continued)

OTHER PUBLICATIONS

Withers, "Thin-Film HTS Probe Coils for Magnetic-Resonance Imaging", IEEE Transactions on Applied Superconductivity, Mar. 1993, vol. 3, No. 1, pp. 2450-2453.

(Continued)

*Primary Examiner* — Bryce M Aisaka
(74) *Attorney, Agent, or Firm* — Sriram Srinivasan

(57) ABSTRACT

A device is described having one or more conductive loops to produce an electromagnetic field, such as for wireless power transfer to an electronic device. In some examples, an antenna is used with at least one resonating capacitor ring that is relatively co-planar with the antenna, and that is magnetically coupled to the antenna but is not electrically powered by an external source. In addition, a device is described having two or more thin-film coils, each coil comprising a pair of terminals and at least one loop defining a plane and an interior region. In some examples, the planes of the two or more coils are disposed substantially parallel to one another, the interior regions of the two or more coils at least partially overlap one another, and the pairs of terminals of the antennae are electrically connected in parallel.

8 Claims, 13 Drawing Sheets

(56) References Cited

U.S. PATENT DOCUMENTS

| | | | |
|---|---|---|---|
| 10,847,874 B2* | 11/2020 | Park | .................... H01Q 1/3291 |
| 2013/0328408 A1 | 12/2013 | Georgakopoulos | |
| 2014/0070765 A1* | 3/2014 | Hasegawa | ............... H02J 50/60 |
| | | | 320/108 |
| 2015/0045227 A1 | 2/2015 | Ahn | |
| 2015/0163864 A1 | 6/2015 | Baarman | |
| 2016/0036261 A1 | 2/2016 | Lenive | |
| 2017/0054213 A1 | 2/2017 | Singh | |
| 2017/0163098 A1 | 6/2017 | Ahn | |

FOREIGN PATENT DOCUMENTS

| | | |
|---|---|---|
| CN | 106300573 | 1/2017 |
| CN | 105743191 | 12/2018 |
| CN | 108653842 B | 12/2020 |
| CN | 108686275 B | 12/2020 |
| EP | 2555376 | 2/2013 |
| EP | 2645385 | 10/2013 |
| EP | 3089373 | 2/2016 |
| KR | 10-1179398 | 9/2012 |
| WO | WO 2007-090168 | 8/2007 |
| WO | WO 2009-114671 | 9/2009 |
| WO | WO 2014-054893 | 4/2014 |
| WO | WO 2017-027326 | 2/2017 |
| WO | WO 2017-031348 | 2/2017 |
| WO | WO 2018-222669 | 12/2018 |

OTHER PUBLICATIONS

International Search Report for PCT International Application No. PCT/IB2019/060768, mailed on Mar. 3, 2020, 5 pages.

\* cited by examiner

Single Coil

Stack - Same Source

WIRELESS POWER TRANSFER

CROSS-REFERENCE TO RELATED APPLICATIONS

This Application is a national stage filing under 35 U.S.C. 371 of International Application No. PCT/IB2019/060768, filed 13 Dec. 2019, which claims the benefit of Provisional U.S. Patent Application No. 62/787,005, filed 31 Dec. 2018, the entire disclosure of each of which is incorporated herein by reference.

TECHNICAL FIELD

This disclosure relates to wireless power transfer.

BACKGROUND

Electronic business management devices have been evolving since the introduction of mobile electronic devices such as laptops, smart watches, smartphones, Bluetooth keyboards, and other portable electronic devices (PEDs). The inconvenience in packing and transporting multiple electronic devices is compounded by the devices' frequent need to be re-charged. Having a nearly ubiquitous power source and a convenient, passive method of charging a device increases efficiency and productivity in a mobile workspace environment. Wireless power transfer using inductive coupling and magnetic resonance is commonly used in wireless charging systems, near-field communication (NFC), and radio-frequency identification (RFID) systems. Several smartphone makers have recently incorporated wireless charging capabilities into their devices. Current wireless charging systems may experience a significant decrease in charging efficiency when the portable electronic device is not substantially aligned with the charging coil, due at least in part to uneven distribution of the magnetic field density

SUMMARY

In general, this disclosure describes devices and methods for improving the efficiency, improving the utility, and/or reducing the cost of wireless power transfer systems, and in particular, systems for wireless charging of portable electronic devices. In one example, a device includes an antenna comprising a plurality of conductive loops to produce an electromagnetic field for wireless power transfer, and an inner resonating capacitor loop or ring disposed substantially co-planar to the antenna and concentric with the plurality of conductive loops, wherein the inner resonating capacitor ring is passive (i.e., not actively powered by a connection to an electrical power source).

In another example, a device includes an antenna comprising a plurality of concentric conductive loops to produce an electromagnetic field for wireless power transfer, and an outer resonating capacitor ring disposed co-planar to the antenna and concentric with the plurality of conductive loops, wherein the outer resonating capacitor ring is not actively powered by an electrical connection.

In another example, a device includes an antenna comprising a plurality of concentric conductive loops to produce an electromagnetic field for wireless power transfer, and both an inner and an outer resonating capacitor ring disposed co-planar to the antenna and concentric with the plurality of conductive loops, wherein the resonating capacitor rings are not actively powered by an electrical connection.

In another example, a device includes two or more thin-film coils, each coil comprising at least one loop defining a plane and an interior region, wherein the planes of the two or more coils are disposed substantially parallel to one another, and wherein the interior regions of the coils at least partially overlap one another.

The details of one or more examples of the disclosure are set forth in the accompanying drawings and the description below. Other features, objects, and advantages of the disclosure will be apparent from the description and drawings, and from the claims.

DETAILED DESCRIPTION

In general, this disclosure describes devices and methods for improving the efficiency, improving the utility, and/or reducing the cost of wireless power transfer, and in particular, wireless charging of portable electronic devices. In some examples, a charging device includes a thin-film, flexible inductive antenna coil and a concentric resonant capacitor ring inductively coupled with, but not electrically powered by, the energy from the main antenna coil. Using this technique, one can obtain at least comparable power-transfer performance to charging devices that implement typical litz wire coils, without requiring additional input power, while potentially gaining the advantages of flexible, cheap, and scalable transmitter films.

This disclosure also describes techniques involving stacking multiple overlapping layers of relatively inexpensive thin-film coils, which may enable more homogenous and/or uniform magnetic fields for wireless power transfer, and allow greater tolerance for transferring power to a misaligned electronic device. Additional techniques, such as connecting the coils' terminals in parallel or implementing multiple power sources, may reduce the coils' internal resistance and/or boost power transfer efficiency. Examples in accordance with this disclosure may be applied to wireless power chargers, NFC (Near Field Communication) readers, sign decoration boards, board games, etc.

Figure 1:
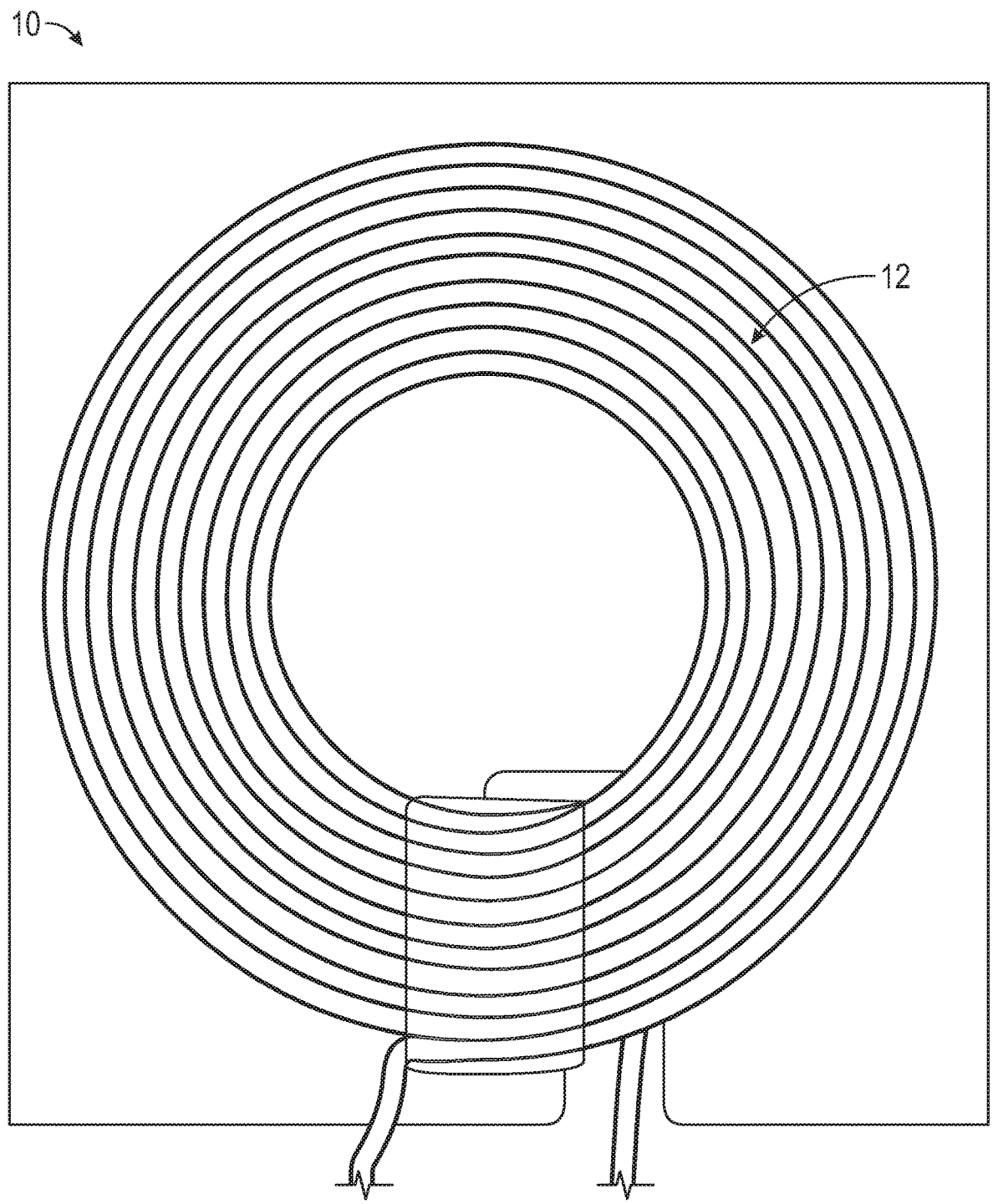
FIG. 1 depicts a conventional litz wire antenna for wireless power transfer.

FIG. 1 depicts a conventional copper litz wire antenna 10 used for wireless power transfer. Due to their thicker wire diameter, litz wire antennas have lower internal electrical resistance, and therefore relatively high power transfer efficiency and lower charging times. For example, a typical antenna 10 wound from a coil of litz wire 12 approximately 0.8 mm in diameter may have a measured resistance of 62 mΩ and inductance of 6.2 pH at a frequency of 150 kHz. An otherwise comparable thin-film copper coil would likely have a higher internal resistance, due to the reduced cross-sectional area of the wire strand. For example, a 33-μm-thick flexible thin-film antenna, having approximately the same circumference and number of turns as coil 12, may have a measured resistance of 698 mΩ and inductance of 4.5 μH at a frequency of 150 kHz. Increased resistance of thin-film coils typically results in lower power-transfer efficiency, often translating to a higher charging time compared to rigid copper litz wire. However, thin-film copper coils may be significantly cheaper and easier to produce and scale than litz wire.

Figure 2A:
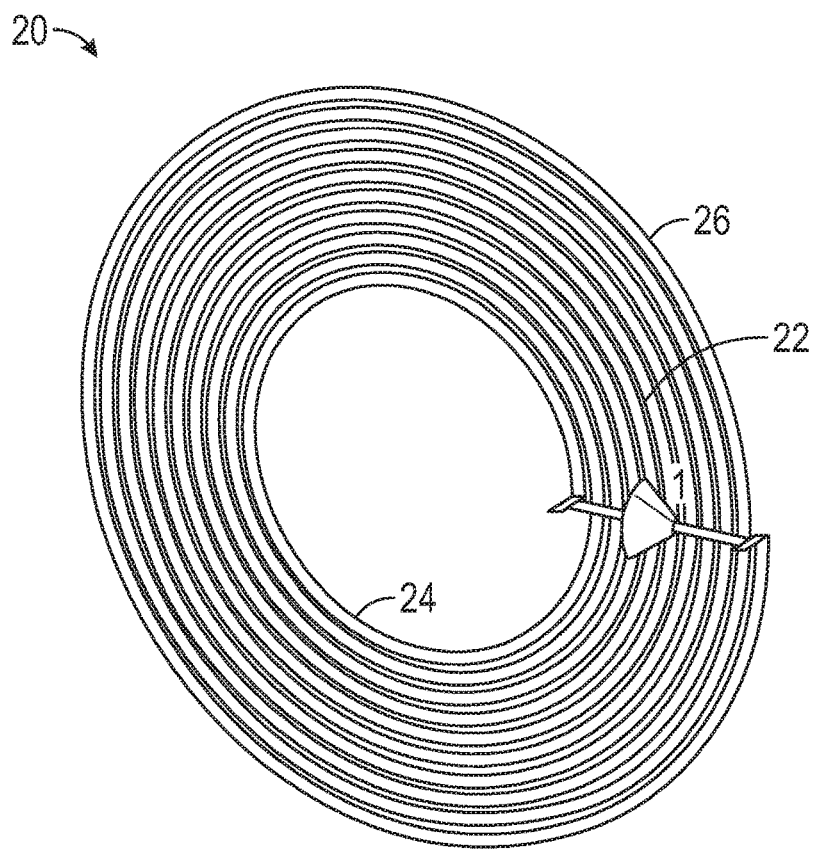
FIG. 2A is an oblique view of a thin-film antenna in accordance with various techniques of this disclosure.

FIG. 2A is an oblique view of a thin-film antenna 20 in accordance with various techniques of this disclosure. In some examples, antenna 20 includes a single-layer loop or coil of copper wire 22, in the form of a thin-film, that is either printed or etched onto a substrate. In some examples, antenna 20 has an outer diameter of 4.8 cm, defining outer circumference 26. Antenna 20 may also have an inner diameter defining inner circumference 24. In some examples, antenna 20 is excited by 700 mA input current, which thereby produces an electromagnetic field between the inner circumference 24 and the outer circumference 26.

Figure 2B:
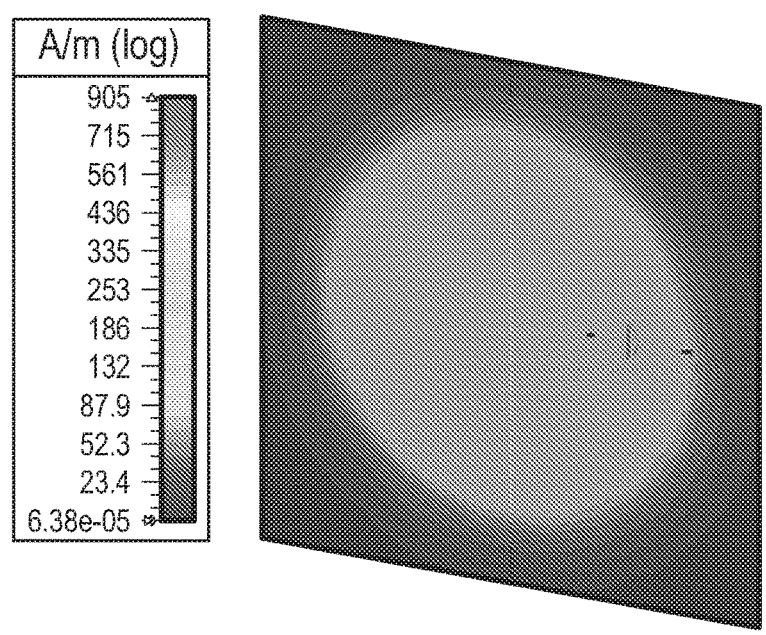
FIG. 2B is a computer-simulation technology (CST) model and electromagnetic (EM) simulation of the thin-film antenna depicted in FIG. 2A, in accordance with various techniques of this disclosure.

FIG. 2B depicts a computer-simulation technology (CST) model and electromagnetic (EM) simulation of thin-film antenna 20 depicted in FIG. 2A, having diameter 4.8 cm and excited by 700 mA input current. The simulation of FIG. 2B illustrates the power density of the electromagnetic field in the region defined by the antenna 20. As shown in FIG. 2B, the power density output by antenna 20 is relatively low in the area of the plane within the coil, and drops to approximately zero in the region of the plane immediately outside the coil. If a device that is to receive power from the coil (i.e., a "power-receiving device", such as a mobile phone) is placed on the plane of the coil, power transfer from the coil to the power-receiving device will be relatively low, since the power density output, as illustrated in FIG. 2B, is relatively low within the plane of the coil. This indicates, for a system that recharges a portable electronic device (PED) by placing the PED on the coil, a relatively low charging efficiency, resulting in relatively long charging times for the PED, and even longer charging times when the PED is misaligned with the coil.

Figure 3A:
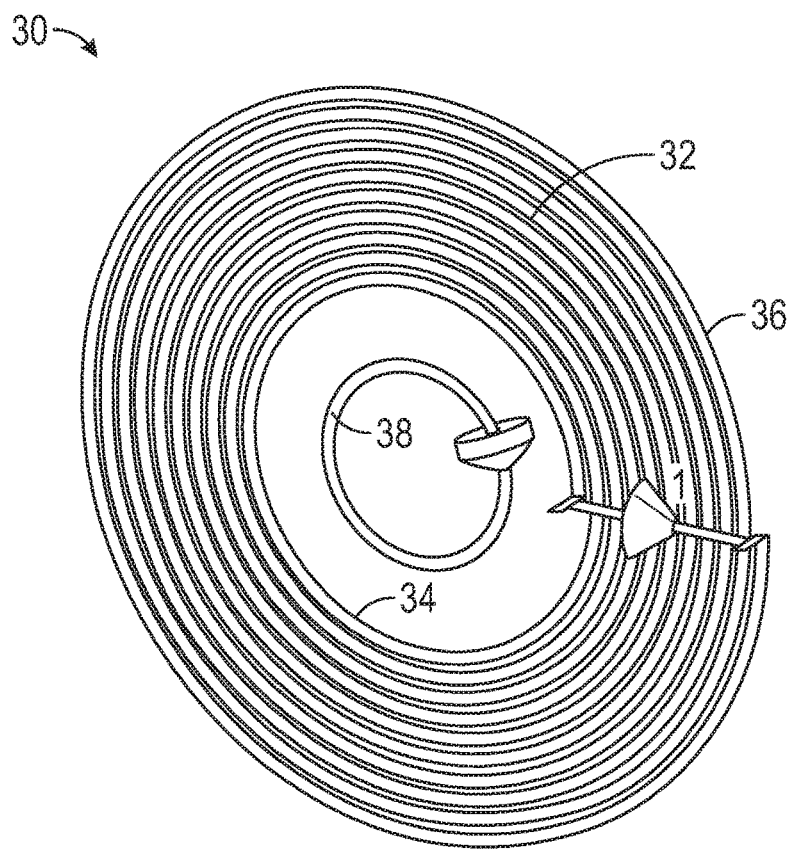
FIG. 3A is an oblique view of a thin-film antenna with inner resonance ring in accordance with various techniques of this disclosure.

FIG. 3A is an oblique view of a thin-film antenna 30 having main antenna coil 32 and inner resonance ring 38, in accordance with various techniques of this disclosure. In the example shown, main coil 32 is composed of multiple loops (for example, ten loops) of a single layer of copper printed or etched onto a substrate. The coil defines inner circumference 34 and outer circumference 36.

In some examples, antenna 30 includes resonating loop structure 38 (referred to herein as "resonance loop", "resonance ring", "resonating capacitor loop", or "resonant capacitor ring"), where resonance loop 38 includes a capacitor tuned to resonate at or near the resonance frequency of main antenna coil 32. In some examples, resonance loop 38 is substantially circular, like a ring-shape. In other examples, resonance loop 38 may have other shapes, such as an oval. In the example depicted in FIG. 3A, resonance ring 38 resonates at the Wireless Power Consortium's "Qi" standard charging frequency of 170 kHz. In some examples, resonance ring 38 may be at least partially composed of copper. In some examples, but not all examples, resonance ring 38 is substantially coplanar and concentric with main antenna coil 32. In some examples, such as the configuration depicted in FIG. 3A, resonance ring 38 has a circumference smaller than inner circumference 34. Resonating ring structure 38 does not require external power input, but is excited through inductive coupling with the EM signal of the main inductor coil 32.

Figure 3B:
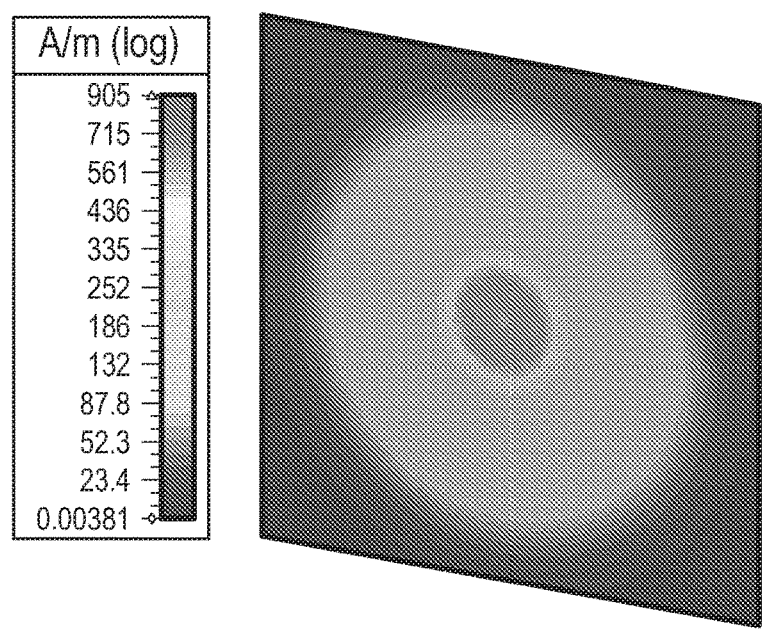
FIG. 3B is a CST model and EM simulation of the thin-film antenna depicted in FIG. 3A, in accordance with various techniques of this disclosure.

FIG. 3B depicts a CST model and EM simulation of thin-film antenna 30 depicted in FIG. 3A, having outer diameter 4.8 cm excited by 700 mA input current. Compared to antenna 20 of FIG. 2A, the magnetic field strength of antenna 30 is significantly stronger over a larger area, particularly in the central region inside of resonance ring 38. This increase in magnetic field strength, which would occur for both rigid copper wire and flexible copper film implementations, may be sufficient to enable the practical use of flexible copper films for wireless charging of PEDs, such as cell phones.

Figure 4A:
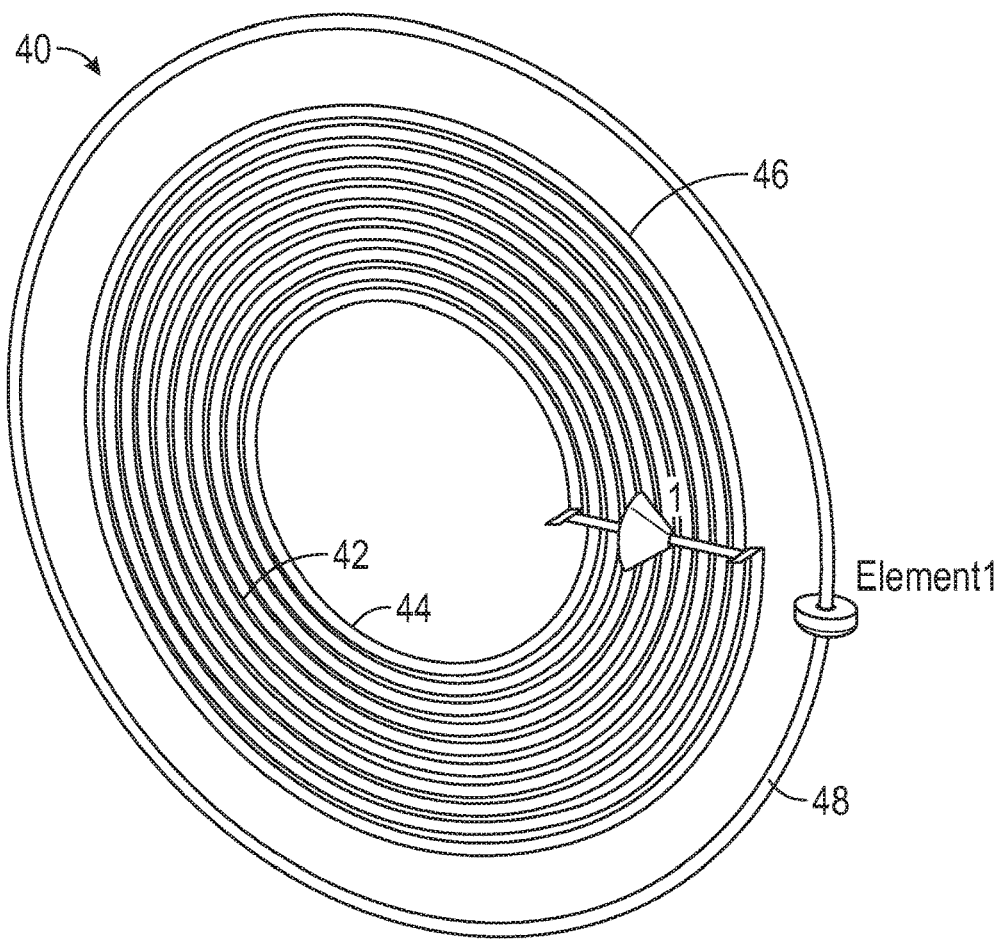
FIG. 4A is an oblique view of a thin-film antenna with outer resonance ring in accordance with various techniques of this disclosure.

FIG. 4A is an oblique view of a thin-film antenna 40 having main antenna coil 42 and outer resonance ring 48, in accordance with various techniques of this disclosure. Antenna 40 includes main coil 42, composed of multiple loops (for example, ten loops) of a single layer of copper printed or etched onto a substrate. The coil defines inner circumference 44 and outer circumference 46.

In some examples, antenna 40 includes resonating ring structure 48, which resonates at the Qi standard frequency of 170 kHz. In some examples, resonance ring 48 is substantially coplanar and concentric with main antenna coil 42. In the configuration depicted in FIG. 4A, resonating ring 48 has a circumference larger than outer circumference 46. Resonating ring structure 48 does not require external power input, but is excited through inductive coupling with the EM signal of the main inductor coil 42.

Figure 4B:
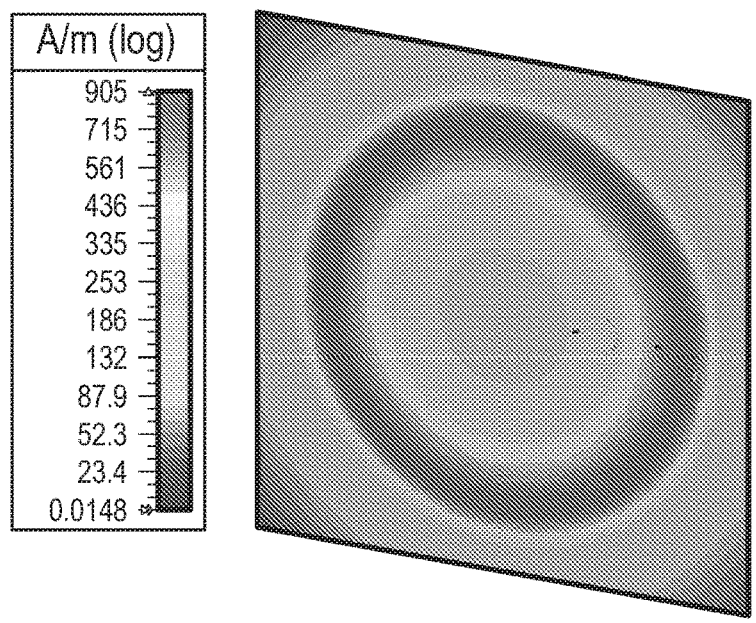
FIG. 4B is a CST model and EM simulation of the thin-film antenna depicted in FIG. 4A, in accordance with various techniques of this disclosure.

FIG. 4B depicts a CST model and EM simulation of thin-film antenna 40 depicted in FIG. 4A, having outer diameter 4.8 cm excited by 700 mA input current. Compared to antenna 20 of FIG. 2A, the magnetic field strength of antenna 40 is significantly stronger over a larger area, and substantially stronger in the outer region near and/or within resonance ring 48. This increase in magnetic field strength may be sufficient to enable the practical use of flexible copper films for wireless charging of PEDs. Additionally, the example illustrated in FIG. 4A may, if used as a charging device, enable a greater tolerance for misalignment of a PED with charging coil 42 (i.e., comparable charging efficiency even when the PED is not sufficiently aligned or within the plane of the antenna 40), since the outer ring results in a strong magnetic field distributed over a larger area compared to the magnetic fields depicted in FIGS. 2B and 3B.

Figure 5A:
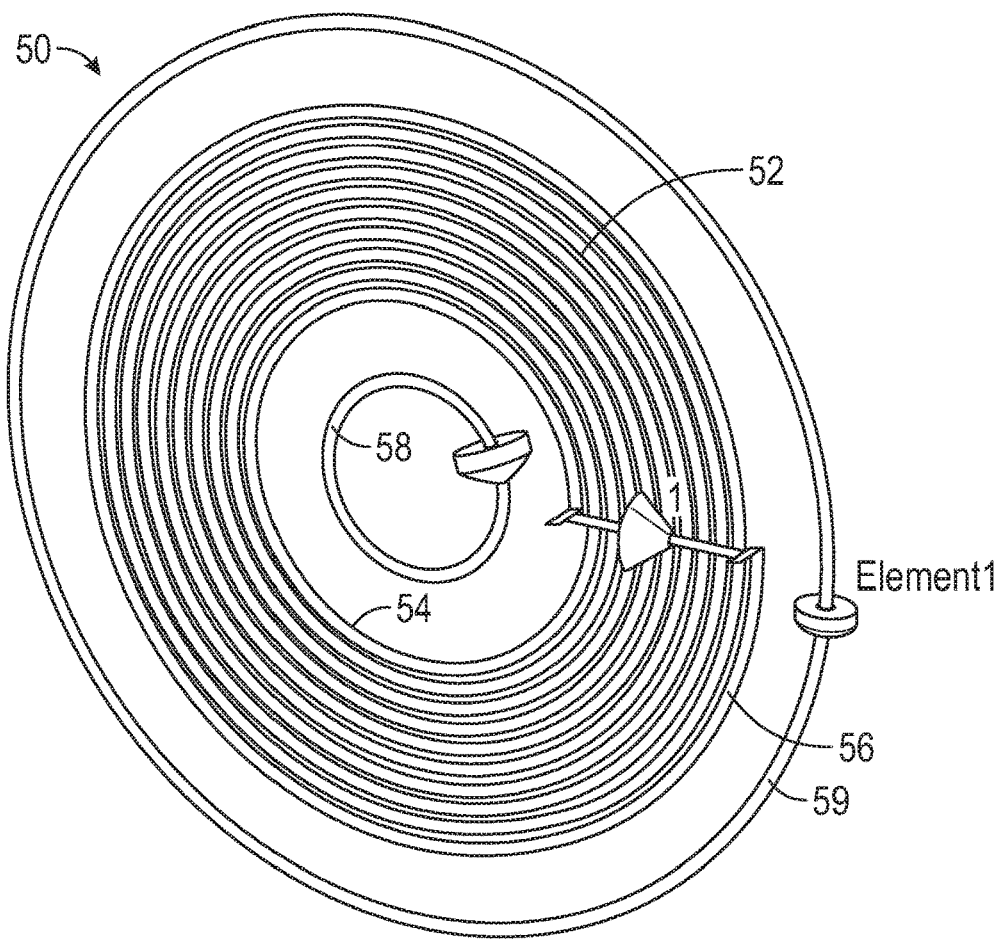
FIG. 5A is an oblique view of a thin-film antenna with inner resonance ring and outer resonance ring, in accordance with various techniques of this disclosure.

FIG. 5A is an oblique view of a thin-film antenna 50 having main antenna coil 52, inner resonance ring 58, and outer resonance ring 59, in accordance with various techniques of this disclosure. Antenna 50 includes main coil 52, composed of multiple loops (for example, ten loops) of a single layer of copper printed or etched onto a substrate. The coil defines inner circumference 54 and outer circumference 56.

In some examples, antenna 50 includes inner resonating ring structure 58, which resonates at the Qi standard frequency of 170 kHz. In some examples, resonance ring 58 is substantially coplanar and concentric with main antenna coil 52. In the configuration depicted in FIG. 5A, inner resonating ring 58 has a circumference smaller than inner antenna circumference 54. Inner resonating ring structure 58 does not require external power input, but is excited through inductive coupling with the EM signal of the main inductor coil 52.

In some examples, antenna 50 includes outer resonating ring structure 59. Outer resonating ring 59 may be a resonant capacitor ring configured to resonate at or near the resonating frequency of main antenna coil 52, for example, the Qi standard frequency of 170 kHz. In some examples, outer resonance ring 59 is coplanar and concentric with main antenna coil 52. In the example configuration depicted in FIG. 5A, outer resonating ring 59 has a circumference larger than outer antenna circumference 56. Outer resonating ring structure 59 does not require external power input, but is excited through inductive coupling with the EM signal of main inductor coil 52.

Figure 5B:
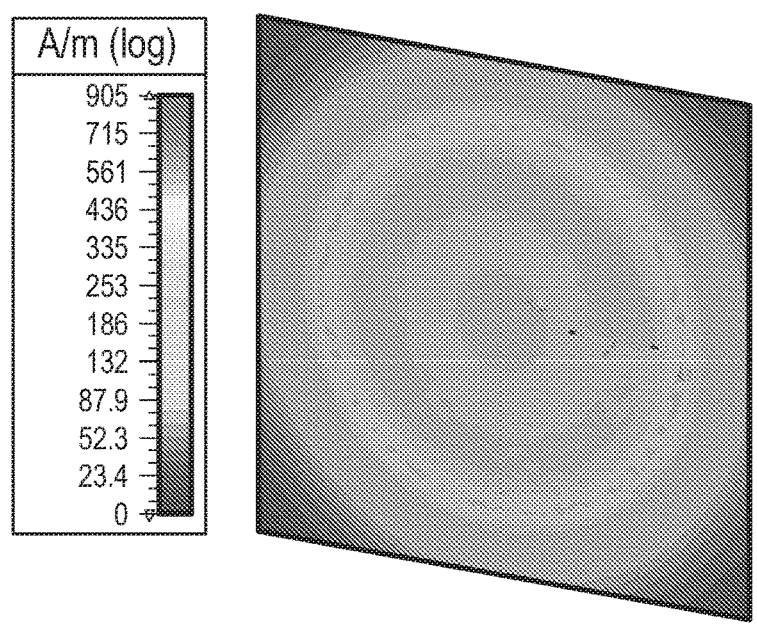
FIG. 5B is a CST model and EM simulation of the thin-film antenna depicted in FIG. 5A, in accordance with various techniques of this disclosure.

FIG. 5B depicts a CST model and EM simulation of thin-film antenna 50 depicted in FIG. 5A, having outer diameter 4.8 cm excited by 700 mA input current. Compared to antenna 20 of FIG. 2A, the magnetic field strength of antenna 50 is significantly stronger over a larger area, and almost uniformly distributed. This increase in magnetic field strength may be sufficient to enable the practical use of flexible copper films for wireless charging of PEDs, and for other applications, such as wireless power transfer for other devices, or for use in decorative boards, lighting, or other applications. Additionally, the example illustrated in FIG. 5A may, if used as a charging device, enable a greater tolerance for misalignment of a PED with charging coil 52 (i.e., comparable charging efficiency even when the PED is not sufficiently aligned), since outer resonance ring 59 results in a strong magnetic field distributed over a larger area compared to the fields depicted in FIGS. 2B and 3B. FIG. 5B shows significant improvement in performance in terms of magnetic field strength over a large area indicating that multiple resonant rings may boost performance of thin-film antennas for wireless power transfer applications.

Figure 6:
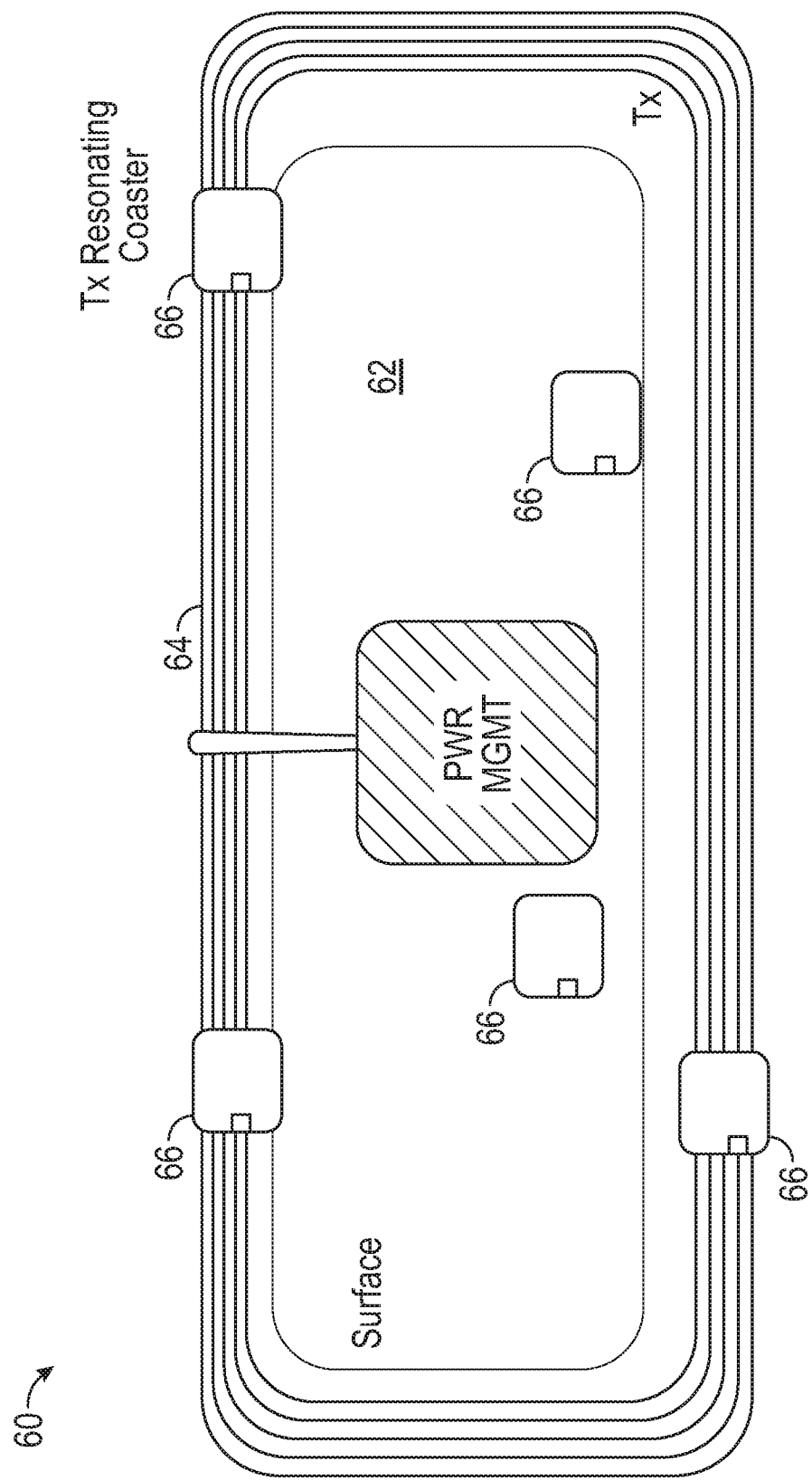
FIG. 6 depicts a system having movable resonating capacitor rings for wireless power transfer in accordance with various techniques of this disclosure.

FIG. 6 depicts a system 60 having movable resonating capacitor rings for wireless power transfer to electronic devices, in accordance with various techniques of this disclosure. In the example depicted in FIG. 6, system 60 includes an object 62 having a substantially planar surface, such as a conference table, desk, workbench, or similar structure. System 60 may include coil antenna 64 disposed around the outer rim of planar surface 62. A power management system (shown near the center of object 62 in FIG. 6) may be within, under, or otherwise connected to object 62 to provide power to the coil antenna 64. For example, antenna 64 may either include a standard litz copper wire coil embedded in surface 62, or alternatively, a thin-film copper coil printed on top of, or embedded underneath the top of, surface 62.

System 60 may further include one or more movable articles or other objects, such as coasters 66, configured to be placed at any point on the top of planar surface 62. Each of movable coasters 66 may include one or more embedded resonating capacitor rings, configured to concentrate the electromagnetic field produced by coil antenna 64 into the region defined by the resonating capacitor ring embedded within the coaster 66. In some examples, articles, objects, or coasters 66 may be flat and relatively thin.

In one example, conference table 62 includes a planar surface surrounded by one or more people seated at the outer rim. Each of the people, such as attendees of a meeting, may carry one or more portable electronic devices (PEDs), such as a smartphone, PDA, laptop, computer mouse, etc. Each attendee may place a PED on one of coasters 66, which, when configured with a resonating capacitor ring, concentrates the electromagnetic field of antenna 64 to the region of the coaster, enabling wireless charging of the PED when placed on coaster 66. In some examples, table 62 may operate in a "low-power mode", wherein the electromagnetic field produced by antenna 64 may be either not strong enough or not concentrated enough to power a PED without the use of a coaster 66, allowing for reduced energy consumption and reduction of wasted energy.

Figure 7:
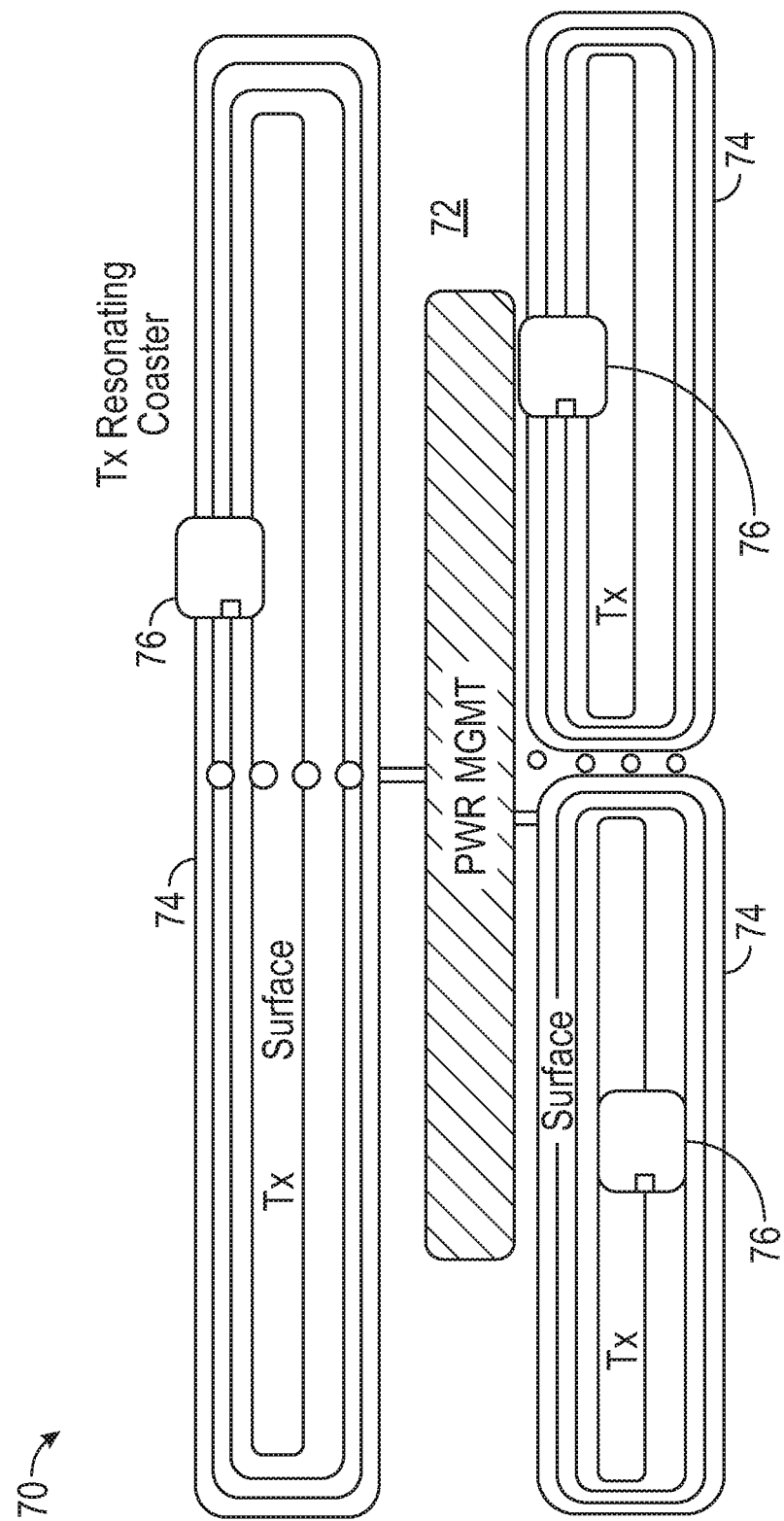
FIG. 7 depicts a system having multiple antennae and movable resonating capacitor rings for wireless power transfer in accordance with various techniques of this disclosure.

FIG. 7 depicts a system having multiple antennae and movable resonating capacitor rings for wireless power transfer in accordance with various techniques of this disclosure. In the example depicted in FIG. 7, system 70 includes an object 72 having a substantially planar surface, such as a conference table, desk, workbench, or similar structure. System 70 may include multiple coil antennae 74 disposed around various sections of planar surface 72. For example, antenna 74 may either include a standard litz copper wire coil embedded in surface 72, or alternatively, a thin-film copper coil printed on top of, or embedded underneath the top of, surface 72.

System 70 may further include one or more movable articles, objects, mouse pads, or coasters 76, configured to be or capable of being placed at any point on the top of planar surface 72. Each of movable coasters 76 may include one or more embedded resonating capacitor rings, configured to concentrate the electromagnetic field produced by coil antenna 74 into the region defined by the resonating capacitor ring embedded in the coaster 76.

In one example, conference table 72 includes a planar surface surrounded by one or more people seated at the outer rim. Each of the people, such as attendees of a meeting, may carry one or more portable electronic devices (PEDs), such as a smartphone, PDA, laptop, computer mouse, etc. Each attendee may place a PED on one of coasters 76, which concentrates the electromagnetic field of antenna 74 to the region defined by the coaster, enabling wireless charging of the PED placed on coaster 76. In some examples, table 72 may operate in a "low-power mode", wherein the electromagnetic field produced by antenna 74 may be either not strong enough or not concentrated enough to power a PED without the use of a coaster 76, allowing for reduced power consumption and reduction of wasted energy.

Figure 8:
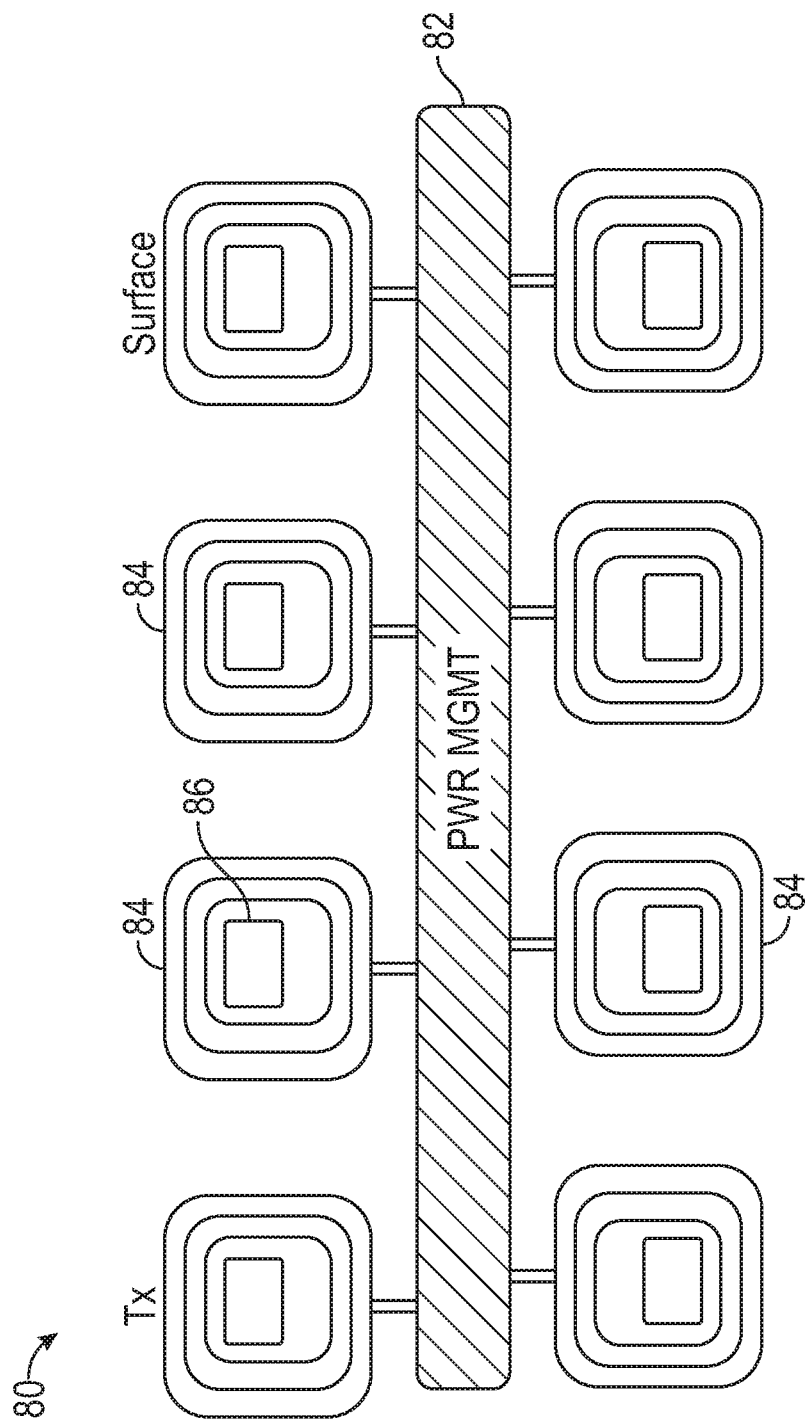
FIG. 8 depicts a system having multiple antennae for wireless power transfer in accordance with various techniques of this disclosure.

FIG. 8 depicts a system 80 having multiple antennae and movable resonating capacitor rings for wireless power transfer in accordance with various techniques of this disclosure. In the example depicted in FIG. 8, system 80 includes an object 82, which may have a separate or integrated power management system. Object 82 may be, or may be part of a conference table, desk, workbench, wall, bar, etc. System 80 may include multiple coil antennae 84, with a separate antenna 84 disposed around each "seat" along the rim of object 82. For example, antenna 84 may either include a standard litz copper wire coil embedded in surface 82, or alternatively, a thin-film copper coil printed on top of, or embedded underneath the top of, object 82.

Each of individual antennae 84 may include one or more resonating capacitor rings 86 configured to focus, amplify, and/or redistribute the antenna's magnetic field, so as to improve the efficiency of wireless power transfer to an electronic device placed on top of the antenna. For example, by including one or more resonating capacitor rings, one of antennae 84 may sufficiently alter the antenna's magnetic field to power a computer mouse placed on or near the antenna. In another example, one or more resonating capacitor rings may enable one of antennae 84 to charge a battery of a mobile phone placed over the antenna. In the example shown in FIG. 8, resonance ring 86 is depicted as the innermost rectangle within antenna 84, although resonance ring 86 may also be disposed around the outside of antenna 84, and may take other shapes, such as a circle.

Although some examples are described herein in terms of multiple circular loops of conductive thin-film material and concentric circular resonant rings of conductive thin-film material, other implementations in accordance with one or more aspects of the present disclosure are possible. For example, conventional copper litz wire or other conductive material may be used to implement either the powered conductive loops or the passive resonant loops, or both. Also, the circular loops of conductive material and/or the circular resonant ring of conductive material need not be in a circular or oval shape, but may be in other shapes, including rectangular or other shapes. Further, although the resonant rings are primarily illustrated in some examples as being concentric with the powered loops of conductive materials, the resonant ring (or resonant loop) may be disposed anywhere within the interior of the loops of conductive material. Still further, although multiple loops of conductive material may be beneficial in generating a more powerful magnetic field, using multiple loops of conductive material is not necessarily required, and one or more aspects of the present disclosure may be implemented with only a single loop.

Figure 9A:
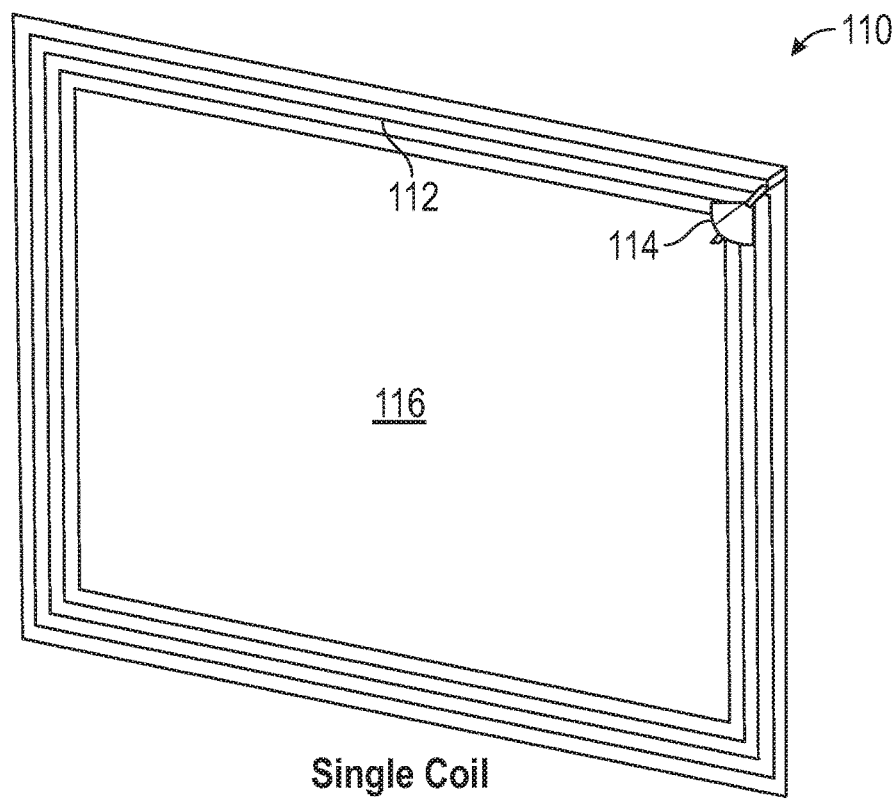
FIG. 9A is an oblique view of a single-layer thin-film antenna, in accordance with various techniques of this disclosure.

FIG. 9A is an oblique view of a single-layer thin-film antenna 110, in accordance with various techniques of this disclosure. Antenna 110 includes thin-film coil 112, which may be printed or etched onto a substrate. In the example depicted in FIG. 9A, coil 112 consists of four loops, although a thin-film coil may include any number of loops. Coil 112 defines an interior region 116. Antenna 110 also includes terminals 114, to which a power source may be connected.

Typical wireless power transfer applications implement a single-layer circular coil made of copper litz wire. Thin-film flexible coils, such as coil 112, are not typically used, as their smaller wire thickness often corresponds to a higher internal resistance, resulting in relatively low power-transfer efficiency compared to copper litz wire.

Figure 9B:
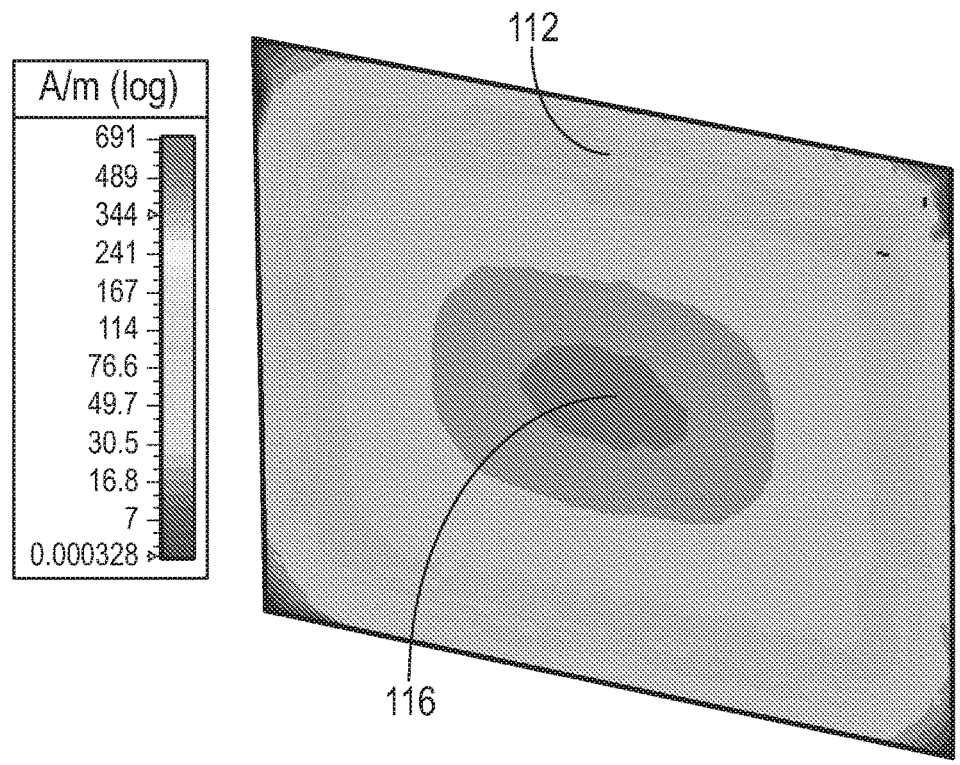
FIG. 9B is a computer-simulation technique (CST) model and electromagnetic (EM) simulation of the thin-film antenna depicted in FIG. 9A, in accordance with various techniques of this disclosure.

FIG. 9B is a computer-simulation technique (CST) model and electromagnetic (EM) simulation of the thin-film antenna 110 depicted in FIG. 9A, in accordance with various techniques of this disclosure. As shown in FIG. 9B, a single-layer thin-film antenna, with its relatively high internal resistance, generates a relatively weak magnetic field in the area immediately surrounding the coil 112, and essentially zero magnetic field everywhere else, such as the interior region 116. Accordingly, a single-layer thin-film antenna is not ideal for wireless power transfer applications. Additionally, because the generated magnetic field is so locally confined to the region immediately at, near, or surrounding the coil 112, even a slight misalignment of an electronic device with respect to the optimal placement of the device relative to the coil may result in significant decrease in power transferred to the device.

Figure 10:
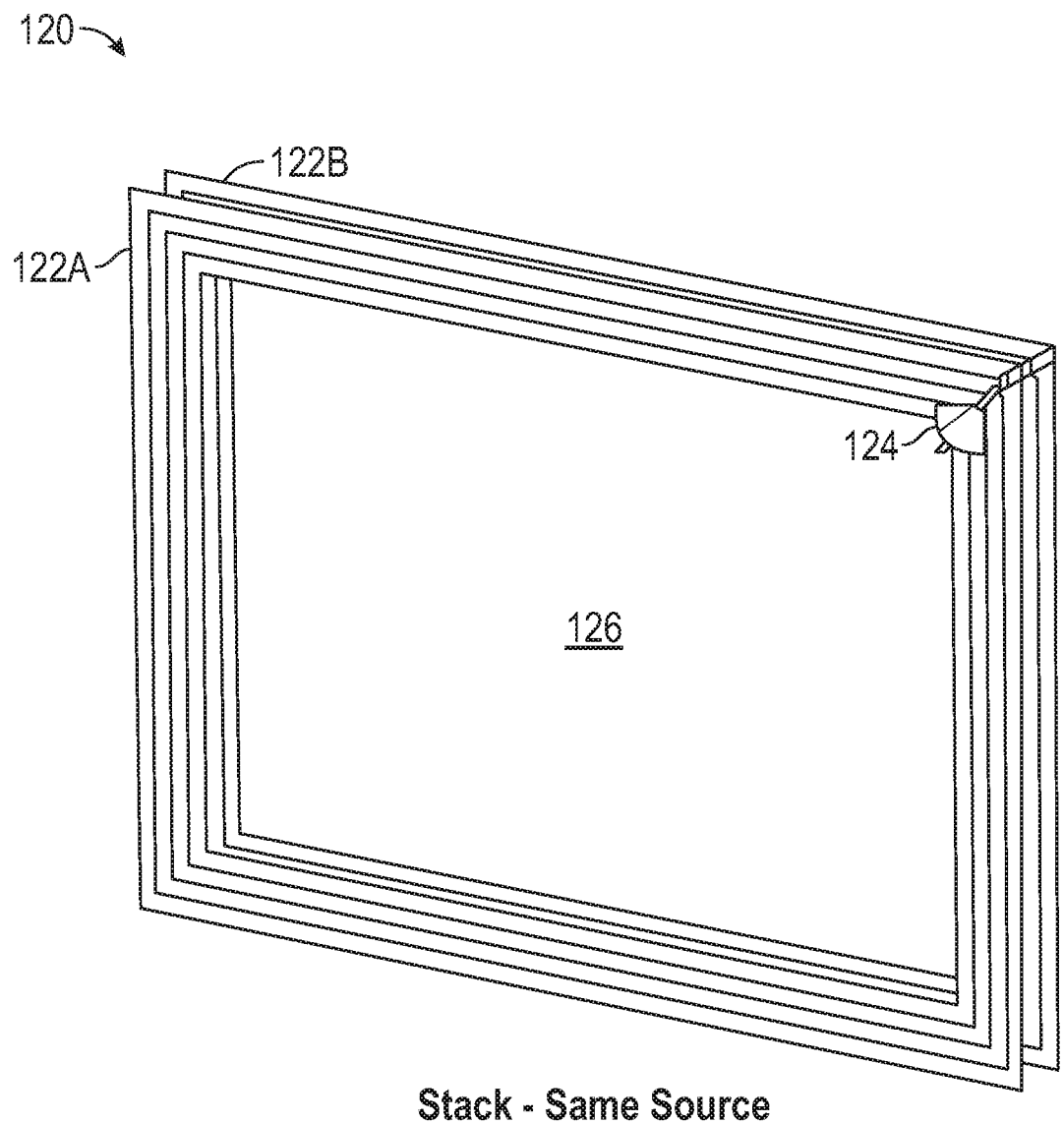
FIG. 10 is an oblique view of a dual-layer stacked thin-film antenna, in accordance with various techniques of this disclosure.

FIG. 10 is an oblique view of a dual-layer stacked thin-film antenna 120, in accordance with various techniques of this disclosure. Antenna 120 includes two thin-film coils 122A and 122B (collectively, coils 122), each of which may be printed or etched onto a substrate. In the example depicted in FIG. 10, each of coils 122 includes four loops, although a thin-film coil may include any number of loops. Because coils 122A and 122B are approximately the same size and substantially overlap each other, coils 122 define a single interior region 126.

Each of coils 122 includes a pair of terminals 124, to which a power source may be connected. In some examples, each pair of terminals may be connected to a different power source. In other examples, each pair of terminals may be connected to a common power source. When connected to a common power source, each pair of terminals may be electrically connected in parallel to each other pair. By electrically connecting each pair of terminals in parallel, the overall resistance of antenna 120 is reduced by the number of coils 122, according to Ohm's law. For example, for the example depicted in FIG. 10 having two coils 122:

$$1/R_{total} = 1/R_1 + 1/R_2$$

For two approximately equal coils 122, the resistance of coil 122A equals the resistance of coil 122B (i.e., $R_1 = R_2$):

$$1/R_{total} = 2/R_1$$

$$R_{total} = R_1/2,$$

Therefore, for an antenna 120 with two coils 122, the total resistance is theoretically halved, significantly increasing the power transfer efficiency of antenna 120 in the region immediately surrounding the coils 122. However, interior region 126 may still experience little to no magnetic field strength because the inductance is correspondingly reduced, resulting in very low tolerance for transferring power to an electronic device that is not substantially aligned with coils 122. Although the total inductance of antenna 120 may similarly be halved by connecting terminals 124 in parallel, a higher inductance value may be attained by increasing the number of loops, changing the width of the conducting line, and/or decreasing the spacing of coils 122.

The electrical resistance of antenna 120 may be reduced even further by increasing the thickness of each of thin-film coils 122. However, increasing the thickness may increase the cost of production, and reduce the flexibility of each coil.

Figure 11:
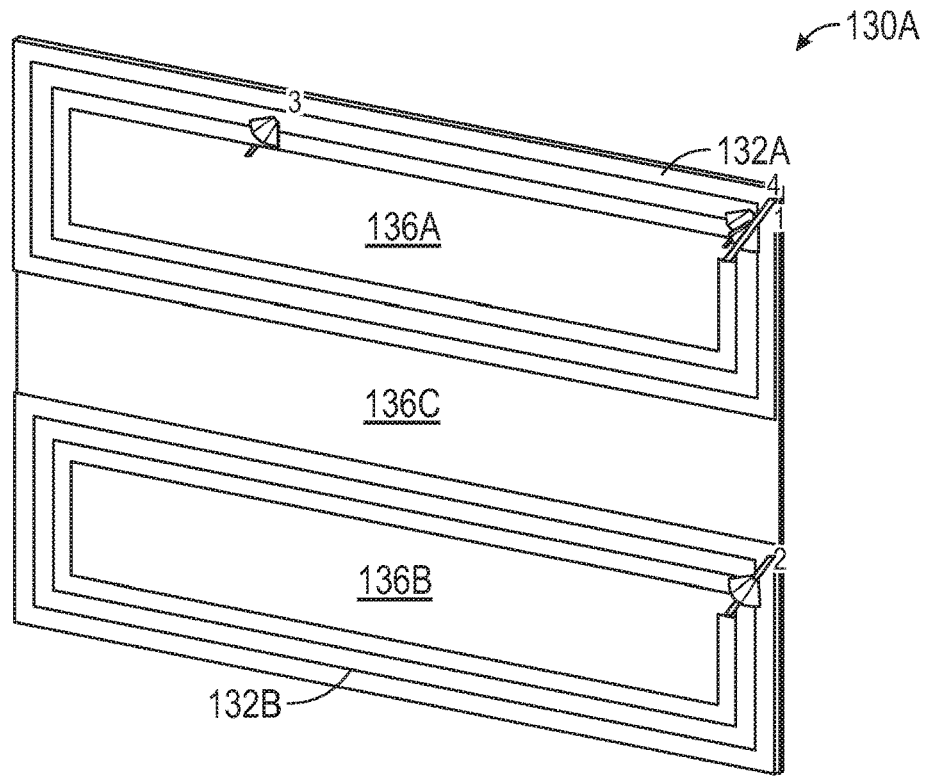
FIG. 11 is an oblique view of two pairs of single-layer thin-film antennae prior to stacking, in accordance with various techniques of this disclosure.
Figure 11:
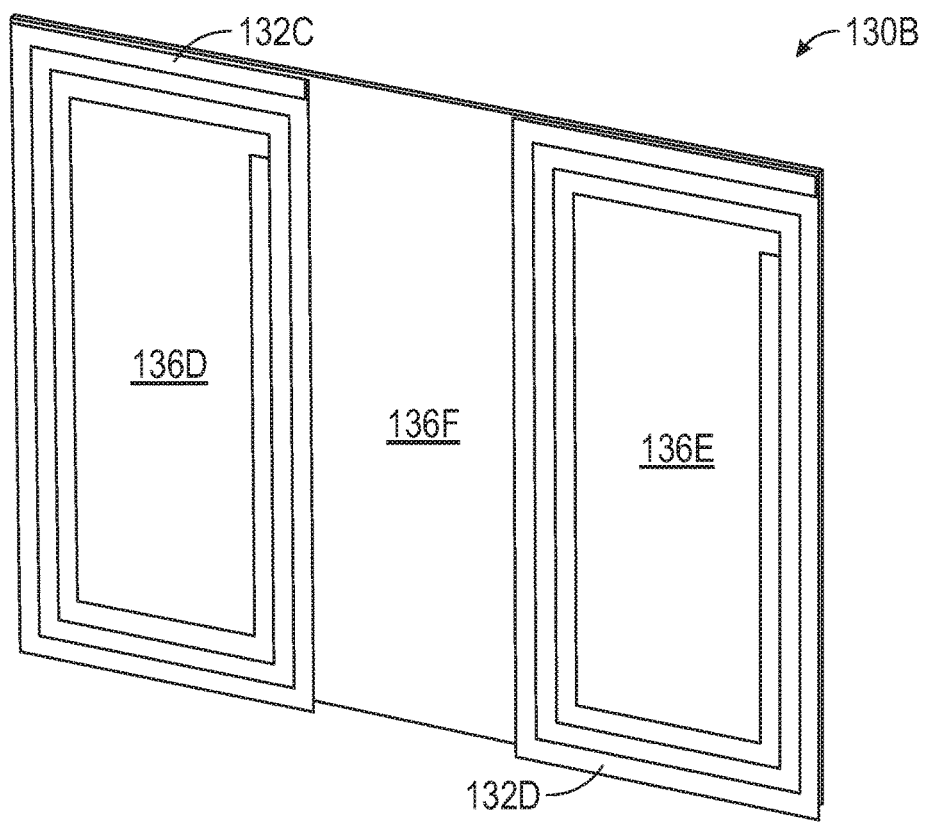

FIG. 11 is an oblique view of two pairs of single-layer thin-film antennae 130A and 130B prior to stacking, in accordance with various techniques of this disclosure. Certain arrangements of stacked layers of thin-film coils may enable a wireless power transfer antenna to generate a substantially uniform magnetic field across its interior region by using multiple coils to divide the single large interior region into multiple smaller ones. For example, antennae pair 130A includes two thin-film coils 132A and 132B, each coil defining an interior space 136A and 136B, respectively. An additional space 136C is provided between the two antennae.

Similarly, antenna pair 130B includes two thin-film coils 132C and 132D, each coil defining an interior region 136D and 136E, respectively. An additional space 136F is provided between the two antennae. In the example depicted in FIG. 11, each of coils 132A-132D has four loops, although coils 123 may include any number of loops. By stacking antennae pairs 130A and 130B (e.g., as in the arrangement depicted in FIG. 12A, described below), a combined single antenna may be produced having a substantially evenly-distributed magnetic field across its interior region, allowing for efficient power transfer to an electric device, even when the electronic device is not substantially aligned with the perimeter of the coil.

Figure 12A:
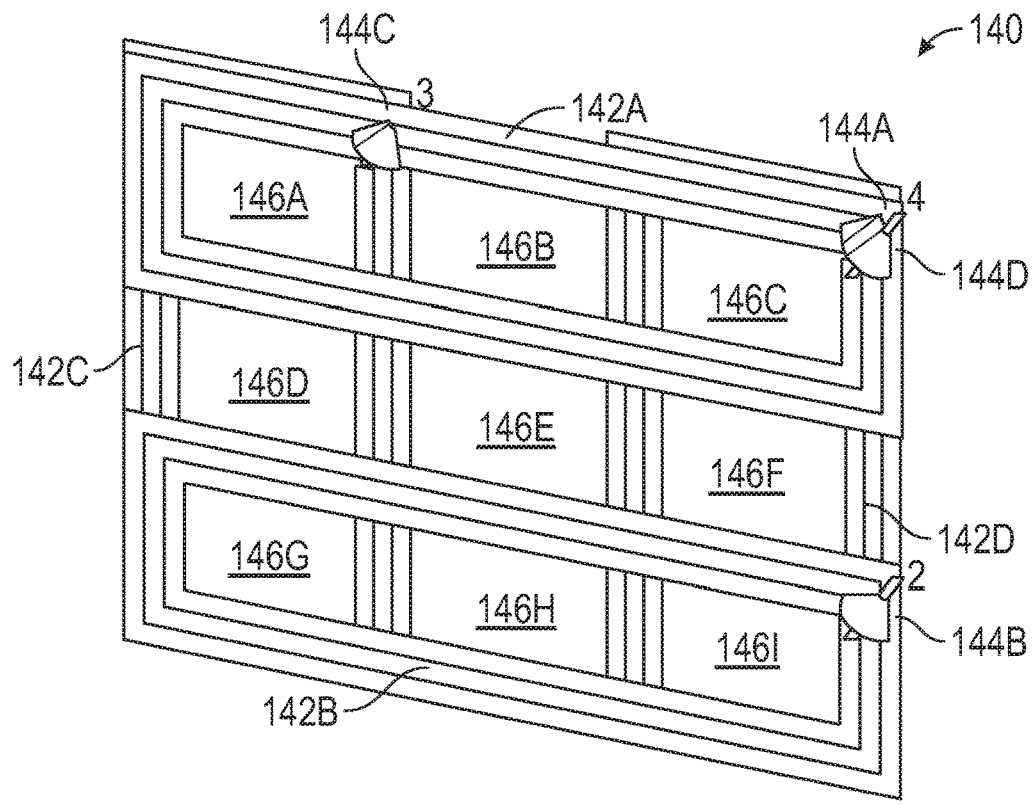
FIG. 12A is an oblique view of the two pairs of thin-film antenna depicted in FIG. 11 after having been stacked, in accordance with various techniques of this disclosure.

FIG. 12A is an oblique view of a dual-layer stacked thin-film antenna 140, in accordance with various techniques of this disclosure. Antenna 140 may be manufactured by producing two pairs of thin-film coils on substrates, such as coil pairs 130A and 130B depicted in FIG. 11, stacking one substrate on top of the other, and electrically connecting the coils' antenna terminals 144 in parallel. In this particular arrangement, the six interior spaces 136A-136F depicted in FIG. 11 may be further divided into nine smaller interior spaces 146A-146I. This particular arrangement may prevent antenna 140 from having a single large interior region that is largely devoid of magnetic field, and instead, more-evenly distributes the magnetic field across the interior, as depicted in FIG. 12B.

In some example applications, antenna 140 may be embedded within a mouse pad (or similar object) to transfer power to a wireless computer mouse or other device. In another example, antenna 140 may be used to charge a battery of a portable electronic device, such as a smartphone, laptop, or tablet.

Figure 12B:
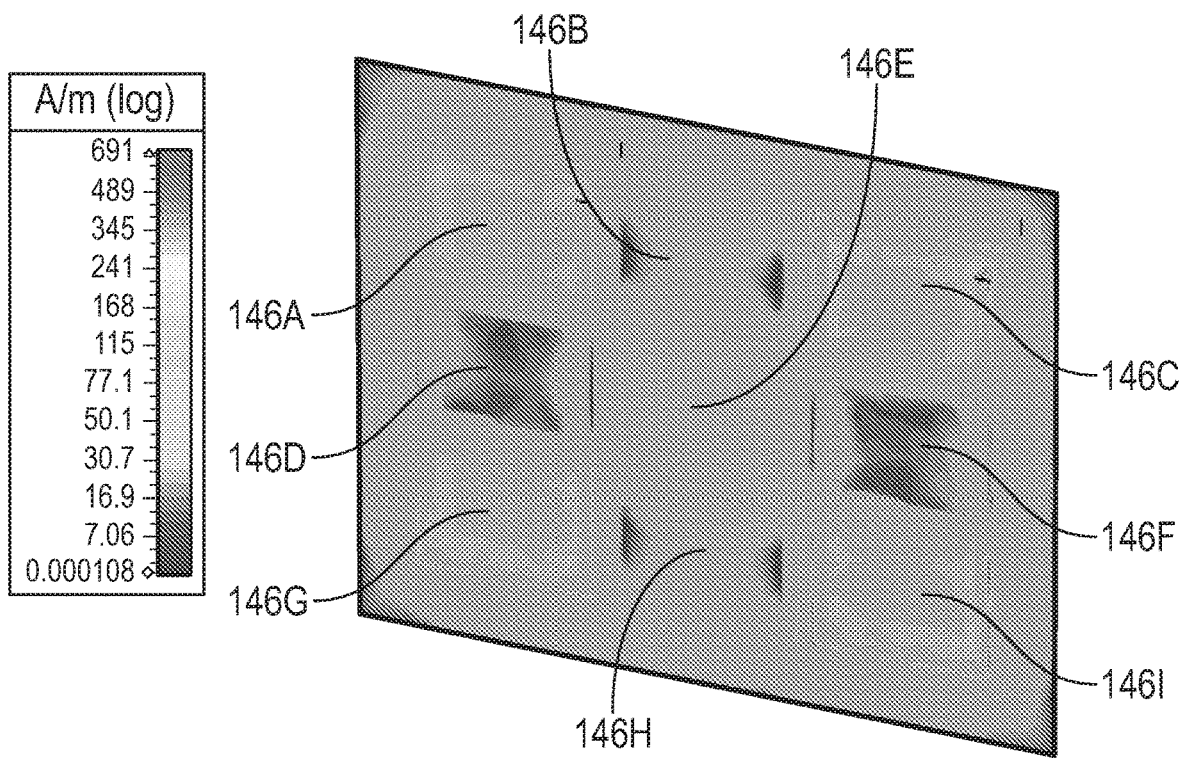
FIG. 12B is a CST model and EM simulation of the dual-layer stacked thin film antenna depicted in FIG. 12A, in accordance with various techniques of this disclosure.

FIG. 12B is a CST model and EM simulation of the dual-layer stacked thin film antenna depicted in FIG. 12A, in accordance with various techniques of this disclosure. As illustrated in FIG. 12B, the configuration of antenna 140 in FIG. 12A results in nine sub-regions 146A-146I of varying magnetic field strengths. For example, sub-regions 146A, 146C, 146E, 146G, and 146I may feature relatively robust magnetic field strengths, due to the constructive interference of the electric currents in those regions. Sub-regions 146B and 146H may feature moderate magnetic field strengths, due to the influence of both constructive and destructive interference of electric currents at their perimeters. Sub-regions 146D and 146F may feature relatively weaker magnetic field strengths, due to the destructive interference of opposing electric currents at their perimeters. Such relatively weaker sub-regions might not be present in all examples in accordance with one or more aspects of this disclosure—alternative antenna designs (for example, adding a third stacked layer to the antenna) may result in even higher uniformity of magnetic field distribution.

Figure 13:
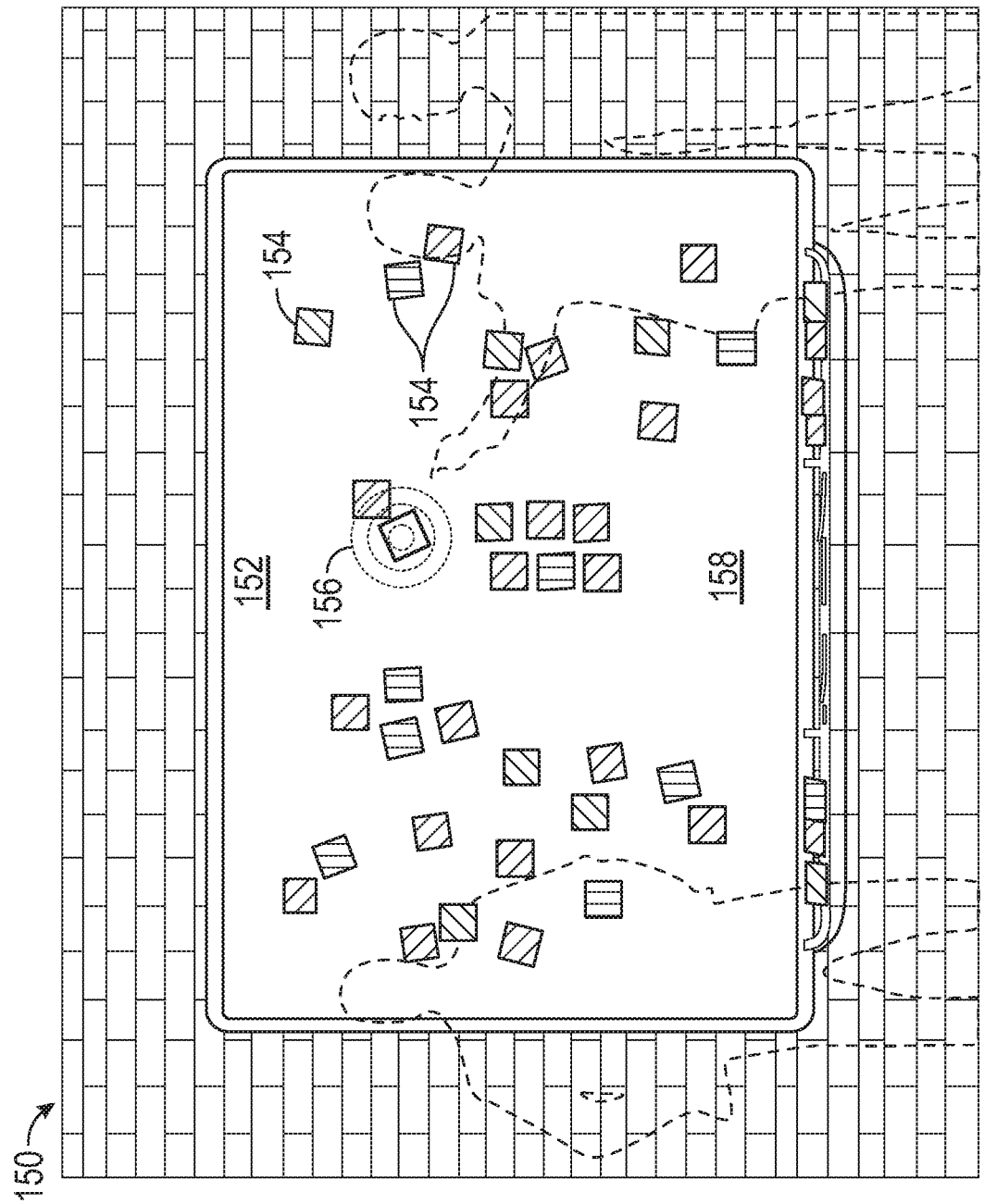
FIG. 13 depicts an example application of stacked thin-film antennae in accordance with various techniques of this disclosure.

FIG. 13 depicts an example application of stacked thin-film antennae in accordance with various techniques of this disclosure. In the example depicted in FIG. 13, system 150 includes an object 152 having a substantially planar surface, such as a wall, whiteboard, or smartboard, (or if oriented differently, a conference table, desk, workbench, or similar structure). A perimeter of object 152 may define an interior region 158. In some examples, interior region 158 may be substantially rectangular, or any other shape, such as circular.

Although not depicted in FIG. 13, system 150 may include a plurality of thin-film coil antennae embedded within the surface of object 152, configured to produce a magnetic field, for example, for wirelessly transferring power to articles placed near the surface of object 150. The thin-film antennae may at least partially overlap one another, for example, to divide the interior region 158 of object 152 into a plurality of smaller sub-regions, so as to more-evenly distribute a magnetic field across the surface.

System 150 may further include one or more movable articles 154, configured to be placed at various points on the surface of object 152. In the example of FIG. 13, articles 154 are depicted as sticky notes, such as Post-it® Notes produced by 3M Corporation of Maplewood, Minn., that are configured to receive power from the antennae embedded within the surface of object 152. In general, movable articles 154 may be any portable electronic device configured to wirelessly receive power from the antennae embedded within the surface of object 152. For example, movable articles 154 may be light-emitting devices, computer mice, mobile phones, laptops, tablets, or any other portable electronic device.

In one example, such as the example depicted in FIG. 13, object 152 includes an interactive whiteboard, and movable articles 154 include a plurality of sticky notes. Sticky notes 154 may include one or more LEDs configured to emit light (as indicated by sticky note 156) by wirelessly receiving power from a plurality of stacked thin-film antenna embedded within the surface of whiteboard 152. Because the thin-film antennae may homogenously or relatively uniformly distribute a magnetic field across the surface of whiteboard 154, sticky note 156 may emit light when placed anywhere on the surface. In some examples, whiteboard 152 may be configured to wirelessly send and receive digital information from articles 154, for example, information displayed as text on a sticky note 154.

What is claimed is:

1. A system comprising:
   a planar surface;
   at least one antenna comprising one or more conductive loops configured to produce an electromagnetic field disposed within the planar surface, wherein each of the one or more conductive loops comprises a copper wire that, in combination with a substrate, forms a thin-film, and wherein the antenna has an outer diameter of 4.8 centimeters; and
   at least one flat article movably disposed on top of the planar surface, wherein the flat article comprises at least one resonating capacitor loop, and wherein the flat article is configured to concentrate the electromagnetic field into an area defined by the flat article.

2. The system of claim 1, wherein the at least one antenna is disposed around an outer rim of the planar surface.

3. The system of claim 1, wherein the at least one flat article is configured to transfer electrical power to an electronic device disposed on top of a coaster that is positioned on top of the planar surface.

4. The system of claim 3, wherein the coaster is configured to charge a battery of the electronic device.

5. The system of claim 4, wherein the electronic device is a mobile phone.

6. The system of claim 3, wherein the electronic device is a computer mouse.

7. The system of claim 1, wherein the at least one antenna comprises a plurality of antennae, each respective antenna of the plurality of antennae being disposed around a separate region of the planar surface.

8. The system of claim 1, wherein the at least one antenna has an excitation current of 700 milliAmperes.

* * * * *